United States Patent Office 3,089,878
Patented May 14, 1963

---

3,089,878
3-ALKYL-4-HYDROXY-7-CHLOROCOUMARIN-6-SULFONAMIDES
Robert F. Meyer, Ann Arbor, Mich., assignor to Parke, Davis & Company, Detroit, Mich., a corporation of Michigan
No Drawing. Filed Nov. 28, 1961, Ser. No. 155,463
3 Claims. (Cl. 260—343.2)

The present invention relates to novel sulfonamide compounds and to means for producing the same. These compounds are represented by the formula:

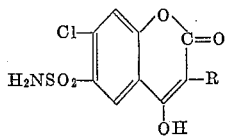

where R is a methyl or ethyl group.

In accordance with the invention, compounds having the above formula are produced by reacting a benzopyran of formula:

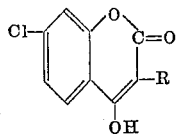

where R has the aforementioned significance, with chlorosulfonic acid and aminating the resulting benzopyran-6-sulfonyl chloride with ammonia. The reaction with chlorosulfonic acid is suitably carried out at temperatures in the approximate range from 100 to 150° C. and preferably at 135–140° C.; at least an equivalent amount, and preferably an excess, up to four molar equivalents or more, of chlorosulfonic acid is employed. The reaction is ordinarily complete in periods ranging from two to five hours; the use of solvents for the reaction is unnecessary. The amination step, which proceeds readily in a short period (within about 5–10 minutes) is carried out preferably in the cold using liquid ammonia. The reaction temperature is not critical and satisfactory results are obtained at room temperature or higher temperature; however, no advantage is gained by operating at these relatively high temperatures. Ammonia may also be supplied in other forms such as ammonium hydroxide and the like. For convenience, ammonia is employed in excess.

The compounds of the invention possess significant diuretic properties and are relatively non-toxic. For example, the products provide relatively high sodium-potassium excretion ratios in the dog when tested orally at doses of 2.5 milligrams per kilogram and higher, by procedures of the type reported in the Journal of Pharmacology and Experimental Therapeutics, volume III, page 285 (1954), and Proceedings of the Society for Experimental Biology and Medicine, volume 78, page 433 (1951). Hence, they have application as diuretic agents suitable for oral administration.

The invention is illustrated by the following example.

*Example*

(a) 7-chloro-4-hydroxy-3-methyl-2-oxo-2H-1-benzopyran (12.5 g.) is added to 50 ml. of chlorosulfonic acid and the mixture is heated at 135–140° C. for three hours. The reaction mixture is cooled, poured onto ice, and the solid sulfonyl chloride which separates is collected by filtration, mixed with excess (100–200 ml.) liquid ammonia and the mixture allowed to stand overnight. The reaction mixture is taken up in water and the solution acidified to pH 4 with concentrated hydrochloric acid. The product which separates in solid form, 7-chloro-4-hydroxy-3-methyl-2-oxo-2H-1-benzopyran-6-sulfonamide, is collected by filtration and recrystallized from aqueous ethanol; M.P. 310–311° C.

By the foregoing procedure, the corresponding 7-chloro - 4 - hydroxy - 3 - ethyl - 2 - oxo - 2H - 1 - benzopyran 6-sulfonamide can be prepared starting with 7-chloro-4-hydroxy-3-ethyl-2-oxo-2H-1-benzopyran (20 g., prepared by the procedure of paragraph (b) which follows, using 19.8 g. of 2-hydroxy-4-chloro-butyrophenone in place of the propiophenone starting material) instead of the above-mentioned benzopyran starting material.

(b) The starting material for the above reaction is prepared as follows: 2-hydroxy-4-chloro-propiophenone (18.4 g.) is dissolved in 300 ml. of diethylcarbonate; 50 g. of 50% sodium dispersion in paraffin is added and the mixture gradually heated to 100° C. Following a mild exothermic reaction, the mixture is cooled, treated with ice (200 g.) and allowed to separate into an aqueous layer and an organic layer. The aqueous layer is washed with either and acidified to pH 4 with concentrated hydrochloric acid. The solid product which separates, 7-chloro-4-hydroxy-3-methyl-2-oxo-2H-1-benzopyran, is collected by filtration, washed with water and recrystallized from isopropanol; M.P. 224–225° C.

I claim:
1. A 1-chloro-4-hydroxy-3-alkyl-2-oxo-2H-1-benzopyran-6-sulfonamide having the formula:

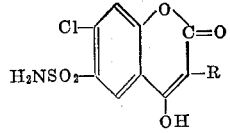

where R is selected from the group consisting of methyl and ethyl.

2. 7 - chloro - 4 - hydroxy - 3 - methyl - 2 - oxo - 2H - 1 - benzopyran-6-sulfonamide.

3. 7 - chloro - 4 - hydroxy - 3 - ethyl - 2 - oxo - 2H - 1 - benzopyran-6-sulfonamide.

References Cited in the file of this patent

Rubtsov et al.: Chemical Abstracts, volume 40 (1946), page 1804.